United States Patent [19]

Becker et al.

[11] Patent Number: 4,545,989

[45] Date of Patent: Oct. 8, 1985

[54] CHEWABLE COMESTIBLE PRODUCT

[75] Inventors: Amy J. Becker, New York; Leonard P. Abbazia, Brooklyn; Mario W. Medri, Huntington, all of N.Y.

[73] Assignee: Warner-Lambert Company, Morris Plains, N.J.

[21] Appl. No.: 558,652

[22] Filed: Dec. 6, 1983

Related U.S. Application Data

[63] Continuation of Ser. No. 303,268, Sep. 17, 1981, abandoned.

[51] Int. Cl.$^4$ .................. A61K 33/06; A23J 9/00; A23J 3/00
[52] U.S. Cl. .................. 424/154; 514/819; 426/564; 426/568
[58] Field of Search ............ 424/154; 426/564, 568; 514/819

[56] References Cited

U.S. PATENT DOCUMENTS

| | | | |
|---|---|---|---|
| 2,926,121 | 2/1960 | Hobbs et al. | 424/154 |
| 3,573,006 | 6/1968 | Shih et al. | 424/154 |
| 4,303,648 | 12/1981 | Witzel et al. | 424/158 |
| 4,327,076 | 4/1982 | Puglia et al. | 424/158 |
| 4,425,332 | 1/1984 | James | 424/154 |

OTHER PUBLICATIONS

*Candy Technology*, Alikonis, pp. 95-118, Mar. 1979.
*Handbook of Non-Prescription Drugs*, "Antacid Products", 1977, pp. 2-17.

*Primary Examiner*—Albert T. Meyers
*Assistant Examiner*—F. Abramson
*Attorney, Agent, or Firm*—Gary M. Nath; Charles A. Gaglia, Jr.

[57] ABSTRACT

A chewable comestible product is disclosed which comprises a frappé component having a density of at least 1.0, and a syrup component including corn syrup, sugar, and water. An antacid is optionally included and may preferably be incorporated into the frappé component. A related method of preparing the comestible product is also disclosed, which includes the processing of the product of the invention by cold processing techniques.

In the instance where the product includes an antacid, metallic user aftertaste is absent.

35 Claims, No Drawings

CHEWABLE COMESTIBLE PRODUCT

This is a continuation of application Ser. No. 303,268 Filed Sept. 17, 1981, abandoned.

BACKGROUND OF THE INVENTION

1. Field of the Invention

The present invention relates to chewable edible products, and particularly to such products as may be prepared into candy, or utilized as a base for the delivery of medicaments and the like.

2. Description of the Prior Art

The present invention relates to the area of chewable comestibles having as part of their utility the ability to be prepared as confectionery products. The preparation of confectionery comestibles is historically well known and has changed very little through the years. In this regard, confectionery items have been classified as either of the "hard" type, or of the soft variety. The present invention relates primarily to this latter type of confection.

The preparation of soft confections such as nougat, involves the combination of two primary components thereof, namely a high boiling syrup such as corn syrup or the like, and a relatively light textured frappé, generally prepared from gelatin, egg albumen, milk proteins such as casein, and vegetable proteins such as soy protein, and the like. The frappé is generally relatively light, and may, for example, range in density from about 0.5 to about 0.7.

By comparison, the high boiled syrup, or "bob syrup", is relatively viscous and possesses a higher density, and frequently contains a substantial amount of sugar. Conventionally, the final nougat composition is prepared by the addition of the "bob syrup" to the frappé under agitation, to form the basic nougat mixture. Further ingredients such as flavorings, oils, additional sugar and the like may be added thereafter also under agitation. A general discussion of the composition and preparation of nougat confections may be found in B. W. Minifie, *CHOCOLATE, COCOA AND CONFECTIONERY: Science and Technology*, 2nd Edition, AVI Publishing Co., Inc., Westport, Conn., (1980), at Pages 424–425.

Various confections have been considered for a variety of differing utilities, such as the development of products containing medicaments and other additives. Conventionally, hard candies have been utilized for such purposes, as they are, by their composition, easier and less expensive to process. By contrast, the soft candy or nougat possesses the shortcoming of being difficult to process except under conditions of elevated temperature, as the prepared product exhibits insufficient integrity at lower temperatures, to undergo the conventional processing utilized for hard candy. For this reason, the preparation of nougat has defied adaptation to the less expensive and more commercially desirable processing techniques utilized with hard candy.

One of the possible applications of confections is their employment as a vehicle for the delivery of medicaments. In particular, the preparation of antacid products in solid form for oral administration, has received wide attention. Specifically, many of the products presently commercially available employ candy bases that are primarily of the hard candy variety that are nonetheless to be ingested by chewing. Most of these products, when placed in the mouth and chewed, however, cause a plating of the antacid over the mouth that results in the sensation of a chalky taste to the user. Efforts have therefore been directed to the development of chewable antacid products that either reduce or completely eliminate the chalky aftertaste. It would therefore be desirable to develop a chewable confection, and a related method of preparation that would enable such confection to be processed in the same manner and with the same apparatus utilized for hard candy. It would also be desirable to develop a chewable confection that may serve as an effective base for the incorporation of medicaments such as antacids, that would substantially reduce or eliminate the chalky aftertaste experienced by the user when the product is chewed and swallowed.

SUMMARY OF THE INVENTION

The present invention relates to a chewable comestible product comprising from about 10% to about 35% by weight of a frappé component having a density of at least 1.0, and a syrup component including corn syrup, and at least one material selected from sugar, starch, water, and mixtures thereof present in an amount constituting the remainder of the comestible product. The frappé component comprises the following ingredients, all present in amounts by weight of the frappé component:

at least one whipping agent, in an amount of from 1.0% to 12%;
corn syrup in an amount of up to about 92%;
sugar in an amount of up to about 55%;
water in an amount of from 4% to 45%.

The comestible product of the present invention may further include a material selected from colorants, flavorings, oils, preservatives, medicaments, and mixtures thereof. Preferably, the present comestible product includes an antacid in an amount of up to about 20% by weight of the product. The antacid may be selected from the group consisting hydroxymagnesium aluminum sulfate, dialuminum sodium carbonate, calcium carbonate, sodium bicarbonate, aluminum hydroxide, magnesium hydroxide, magnesium carbonate, a co-dried gel of aluminum hydroxide and magnesium carbonate, and mixtures thereof. Preferably, the antacid comprises the co-dried gel of aluminum hydroxide and magnesium carbonate.

The present invention also relates to a method for the preparation of the comestible product described above, which comprises preparing a frappé component including the ingredients stated above, adding thereto the syrup component under agitation and at an elevated temperature of at least 175° F., mixing the two components at a temperature of at least 170° F., cooling the resulting mixture and kneading same at a temperature of no higher than about 130° F., and forming the resulting mixture into the final comestible product.

In the instance where the comestible product of the present invention contains an antacid, the antacid is fully dispersed in the frappé component and does not yield the chalky aftertaste when chewed and ingested. The incorporation of the antacid in particulate form with particles ranging up to about 1.5 microns in size, within the frappé results in a homogeneous mixture of the antacid and a full coating of the particles thereof, that averts the development of the chalkiness in the mouth.

A further feature of the present invention is that the method may be performed at lower temperatures, and, in particular, that the final forming of the comestible product may take place at temperatures and in machinery utilized for hard candy cold processing. The present compositions maintain their integrity through cold processing and do not present unwanted adhesion to the processing machinery.

Accordingly, it is a principal object of the present invention to provide a chewable comestible product capable of forming a soft candy such as a nougat, which does not require final forming at elevated temperatures.

It is a yet further object of the present invention to provide a chewable comestible product as aforesaid, which includes a frappé component having a density in excess of 1.0.

It is a yet further object of the present invention to provide a chewable comestible product as aforesaid that is capable of holding an antacid compound, and delivering said antacid without imparting chalky aftertaste to the user.

It is a still further object of the present invention to provide a method for the preparation of a chewable comestible product which does not require final forming at elevated temperatures.

It is a further object of the present invention to provide a method as aforesaid which facilitates the full dispersion of an antacid therewithin by incorporating said antacid into the frappé component thereof.

Other objects and advantages will become apparent to those skilled in the art from a consideration of the ensuing description.

DETAILED DESCRIPTION

The present invention relates to a chewable comestible product capable of formulation into a nougat-type confection. The comestible product comprises a frappé component having a density of at least 1.0 to about 1.6, and a syrup component including corn syrup, and at least one material selected from sugar, starch, water, and mixtures thereof. The syrup component is known in the art as the "bob syrup" and is generally a conventional ingredient in the formation of nougats.

The frappé component of the present invention may comprise the following ingredients, expressed in percent by weight of the frappé component:

at least one whipping agent, in an amount of from 1.0% to 12%;
corn syrup in an amount of up to about 92%;
sugar in an amount of up to about 55%;
water in an amount of from about 4% to about 45%.

Suitable whipping agents may include egg albumen, gelatin, milk proteins or other milk derived compounds such as whey, and a casein derivative known as "Hyfoama", vegetable proteins such as soy derived compounds, and mixtures thereof.

The sugar component, while listed separately, actually includes corn syrup as a source thereof, and may be used in alternation therewith. In particular, corn syrup may be used alone, or a variety of sugars may be used in its place; namely, invert sugar, fine granular sugar, liquid sugar, and the like. The exact choice of the sugar component may vary with the texture and ultimate utility of the comestible product to be prepared.

The frappé, in addition to the foregoing materials, may also include other additives comprising materials such as colorants, flavorings, and various medicaments. A feature of the method of the present invention, discussed later herein, comprises the incorporation into the frappé of certain medicaments, with the result that the medicaments are uniformly and thoroughly dispersed therein, and a more palatable delivery system for the medicament is thus attained.

In one embodiment of the present invention the chewable comestible product contains, preferably in the frappé component, an antacid compound, so that the comestible product serves as a delivery vehicle therefor. Suitable antacid compounds that may be incorporated herein include hydroxymagnesium aluminum sulfate, dialuminum sodium carbonate, calcium carbonate, sodium bicarbonate, magnesium carbonate, aluminum hydroxide, magnesium hydroxide, a co-dried gel of aluminum hydroxide and magnesium carbonate, and mixtures thereof. Preferably, the antacid compound comprises the co-dried gel of aluminum hydroxide and magnesium carbonate.

The antacid compounds are incorporated into the present comestible products in particulate form, with particle sizes ranging from about 1.0 to 1.5 microns. Commercially obtainable antacid is classified according to its particle size in the following manner; "heavy" calcium carbonate, for example, possesses a particle size of about 1.5 microns, while "extra light" calcium carbonate may possess a particle size of 1.0 microns. This standard may be utilized in assessing the desirable particle size for any of the aforementioned antacid compounds.

In the instance where the present comestible product contains the antacid compound, such compound is preferably formulated together with the frappé component, and the frappé component accordingly comprises the following ingredients, expressed in percent by weight of the frappé component:

whipping agent, in from 1.0% to about 9%;
corn syrup, up to about 80%;
sugar, up to about 40%;
water, from about 4% to about 25%;
antacid from about 30% to about 55%.

The syrup component of the present comestible product is generally prepared from corn syrup, and may include other materials, as noted above. The syrup component or "bob syrup" generally comprises substantially the remainder of the chewable comestible product, and preferably may range in amount from about 60% to about 85% by weight of the total product.

The corn syrup ingredient is generally present in the bob syrup in an amount by weight ranging from about 20% to about 55%, and preferably from about 25% to 50% by weight thereof. The corn syrup ingredient includes those corn syrups high in fructose, as well as other commercially available varieties thereof.

The sugar present in the bob syrup may be one of the varieties recited above with respect to the frappé component, and may be present in the bob syrup in an amount of from about 45% to about 80% by weight, and more preferably in an amount of from 45% to about 75% by weight.

A further component of the bob syrup comprises starch. While not mandatory, starch may be included, and starches useful in accordance herewith may comprise those known as the "thin" boiling types. The starch component, when present, is utilized in an amount by weight of the bob syrup, of up to about 7% by weight, and preferably from about 3% to about 4% by weight thereof.

The remainder of the bob syrup may comprise water, which may be present in an amount of up to about 13% by weight of the bob syrup.

In addition to the frappé component and the syrup component, the chewable comestible products of the present invention may include further additives utilized conventionally to prepare nougat products, as well as additional materials that are capable of being incorporated therein for specific applications. Thus, the present comestible products may include materials selected from pigments, colorants, oils, fats, preservatives, flavorings, and mixtures of these in varying amounts.

Those materials generally incorporated and desirable to aid in the final processing of the comestible products, include the fats, preservatives, colorants and flavorings. Suitable oils and fats would include partially hydrogenated vegetable or animal fats, such as coconut oil, palm kernel oil, beef tallow, lard, and the like. These ingredients are generally utilized in amounts with respect to the comestible product of up to about 7.0% by weight, and preferably up to about 3.5% by weight of the final product.

In a preferred embodiment, the fats and oils component of the present invention may comprise palm kernel oil and glycerol monostearate. These materials are added to the mixture of the frappé component and the syrup component, frequeuntly in combination with a preservative such as BHA or BHT, and an auxiliary sweetener, and the like.

The comestible products of the present invention may be prepared to offer a variety of chewing textures to suit particular applications. Thus, for example, the product when prepared with the ingredients disclosed above may provide an extended chew similar to taffy candy. If it is desired to prepare a product having a "shorter" chew, a graining promoter such as 6x sugar or the like may be added in small amounts, on the order of about 0.5% by weight of the total product. Naturally, the presence, amount and manner of addition of such graining promoter may vary within the skill of the art, within the scope of the present invention.

In the instance where auxiliary sweeteners are utilized, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt; the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also contemplated as an additional sweetener is the non-fermentable sugar substitute (hydrogenated starch hydrolysate) which is described in U.S. Pat. No. Re. 26,959. Also contemplated is the synthetic sweetener 3,6-dihydro-6-methyl-1,2,3-oxathiazin-4-one-2,2-dioxide particularly the potassium, sodium and calcium salts thereof as described in German Pat. No. 2,001,017.7.

Suitable flavorings include both natural and artificial flavors, and mints such as peppermint, menthol, artificial vanilla, cinnamon, various fruit flavors, both individual and mixed, and the like are contemplated. The flavorings are generally utilized in amounts that will vary depending upon the individual flavor, and may, for example, range up to 1% by weight or higher.

The colorants useful in the present invention, include the pigments such as titanium dioxide, that are incorporated directly into the frappé and may be incorporated therein in amounts of up to about 1% by weight, and preferably up to about 0.6% by weight. Also, the colorants may include other dyes suitable for food, drug and cosmetic applications, and known as F.D. & C. dyes and lakes. The materials acceptable for the foregoing spectrum of use are preferably water-soluble, and include indigoid dye, known as F.D. & C. Blue No. 2, which is the disodium salt of 5,5'-indigotindisulfonic acid. Similarly, the dye known as F.D. & C. Green No. 1, comprises a triphenylmethane dye and is the monosodium salt of 4-[4-(Nethyl-p-sulfobenzylamino)dipehnylmethylene]-[1-(N-ethyl-N-p-sulfoniumbenzyl)-$\Delta$2,5-cyclohexadienimine]. A full recitation of all F.D. & C. and D. & C. and their corresponding chemical structures may be found in the Kirk-Othmer Encyclopedia of Chemical Technology, at Volume 5, Pages 857–884, which text is accordingly incorporated herein by reference.

The method of the present invention comprises the preparation of the chewable comestible food product by a series of steps, of which the first is the preparation of the frappé component to a density of at least 1.0 to about 1.6, thereafter preparing the syrup component and slowly adding the syrup component to the frappé component under agitation and at a temperature of at least 175° F. The frappé component and the syrup component are thereafter mixed at a temperature of at least 170° F. for a period of time to form a uniform mixture, after which the mixture is cooled to a temperature no higher than about 130° F., and the thus cooled mixture is thereafter formed into the comestible product having a density from about 1.1 to about 1.6.

The first step, comprising the preparation of the frappé component, proceeds by the mixture with each of the ingredients of the frappé component. In particular, the whipping agent is combined with a portion of the corn syrup or the sugar ingredient, whichever is utilized, and water, and is mixed for a period of time sufficient to form a hydrated mixture. Generally, these materials are mixed by agitation or whipping with a whisk, for a period of time on the order of about 10 minutes, which has been found to be sufficient to permit the formation of the desired hydrated mixture.

Thereafter, the remainder of the corn syrup, sugar, if any, and water is added to the above mixture. This last addition is initially brought to a temperature on the order of about 210° F. after which it is added to the remaining mixture.

In the instance where the frappé is prepared to include a medicament such as an antacid, the remainder of the corn syrup or the like and the medicament are added after the initial combination of the whipping agent, corn syrup, sugar and water. These ingredients are added alternately to the initial mixture until fully incorporated in the resulting frappé component.

The syrup component or "bob syrup" is prepared by initially mixing the starch, when included, with ½ of the total amount of water to be utilized in the syrup component. Upon the formation of this first mixture, the remainder of the ingredients of the syrup component, i.e. the corn syrup, sugar and the starch/water mixture, are charged into a pressure cooker and cooked for about 10 minutes to a temperature ranging from about 260° F. to about 280° F., and then a vacuum of approximately 10 inches is applied. The vacuum is applied to assist in removing further moisture from the mixture.

Once the above steps are complete, the frappé component and the syrup component or "bob syrup" may be combined, usually by the addition to the frappé component of the syrup component with agitation. In the instance where a colorant as mentioned above is to be added to the comestible product, such colorant is preferably added to the frappé prior to its combination with the syrup component.

The syrup component is added to the frappé component gradually and with agitation. The addition of the syrup component may be conducted over a period on the order of about 7 minutes, and may take place at a temperature of at least 175° F., and preferably at a temperature ranging from about 195° F. to about 200° F. Thereafter, the resulting mixture may be beaten at a greater speed and intensity until the temperature of the resulting mixture drops to about 190° F. At this point, any fats or oils to be added to the mixture may be liquified and added, and the mixture may be beaten for a further period of time until the temperature thereof drops to about 180° F.–185° F.

One of the features of the present comestible product is that it is capable of undergoing cold processing to form the final product, by technqiues and in apparatus reserved for hard candy formulations. In accordance herewith, it has been found that cold processing may be successfully utilized when the mixture is agitated, as by beating for a period of at least 7 minutes following the addition of the fat or oil component. This additional agitation appears to impart improved integrity to the mass that facilitates continuous processing by such techniques without adhesion to apparatus, jamming or product disintegration.

The mixture is thereafter further beaten until the temperature thereof drops to just below 180° F., at which point any flavorings desired in the final product, may be added. This further mixture is agitated for an additional period of time and is thereafter cooled to about 170° F., at which point it is ready for removal from the mixer. It should be mentioned that the apparatus useful in accordance with the present invention comprises those cooking and mixing apparatus well known in the confectionery manufacturing arts, and therefore the selection of specific apparatus will be apparent to the artisan. In particular, the mixing steps described above are performed on a Hobart Mixer at a variety of mixing speeds, and the cooking of the syrup component may be performed in a Hansella Cooker. Further processing, including the mixing and kneading and ultimate forming of the final product, take place, respectively, on a cold table, a Ruffinatti Mixing Table, a conventional batch former, and an extruder-like device known as a Uniplast. All of the foregoing pieces of equipment are commercially available by the names designated above, and do not per se form a part of the present invention.

As mentioned, the mixture having cooled to about 170° F. is thereafter further cooled and kneaded to a temperature of at least below 130° F. Specifically, the mixture is transferred to a cold table which is maintained at a temperature of about 70° F. and is permitted to reside on the cold table until a "skin" forms thereon, and until the mixture drops in temperature to between 145° F. to about 160° F. Thereafter, the mixture is transferred to a Ruffinatti Mixing Table, which may, for example, be maintained at a temperature of about 68° F. The table includes reciprocating arms with shovel-like ends to knead the mixture. The mixture remains on the Ruffinatti Mixing Table until the temperature thereof drops below 130° F., and preferably within a range of about 110° F. to about 117° F. Generally, the residence time of the mixture on the Ruffinatti Mixing Table is on the order of about 10 to 15 minutes.

After the mixture has attained the aforementioned lower temperature, it is transferred to the extruder-like Uniplast, from which it is cold formed into a strand which is then run through the batch former to punch out discrete tablets or droplets of the final product. Naturally, a variety of final forming processes may be utilized, depending upon the shape and size of the final product as desired. The batch former performs the final shaping operation in a cold room held at a temperature of between 53° to 70° F.

One of the features of the present method is that these final forming operations may be performed with the present composition. That is, such final forming operations are those usually performed in the manufacture of hard candy, where the material is sufficiently cohesive and dense to permit extrusion and cutting to length to occur without fracture or disintegration of the batch.

The comestible product and associated method of the present invention will be better illustrated from a consideration of the following examples.

EXAMPLE 1–15

The following formulations were prepared in accordance with the process parameters discussed above. The individual formulations of the frappés and the bob syrups, as well as the cook temperatures at which the bob syrup was cooked, are set forth serially in tabular form, below.

TABLE I

| FRAPPE COMPOSITIONS | | |
|---|---|---|
| EXAMPLE NO. | INGREDIENT | % BY WEIGHT OF FRAPPE |
| 1 | Egg Albumen | 5.8 |
|   | Fine Granular Sugar | 21.5 |
|   | Water | 21.5 |
|   | Antacid* | 51.2 |
| 2 | Egg Albumen | 5.8 |
|   | Fine Granular Sugar | 21.5 |
|   | Water | 21.5 |
|   | Calcium Carbonate | 51.2 |
| 3–5 | Egg Albumen | 1.3 |
|   | Corn Syrup | 28.6 |
|   | Liquid Sugar | 37.2 |
|   | Antacid** | 32.2 |
|   | Titanium Dioxide | .54 |
| 6–10 | Egg Albumen | 1.28 |
|   | Corn Syrup | 32.70 |
|   | Invert Sugar | 33.24 |
|   | Antacid** | 32.25 |
|   | Titanium Dioxide | .54 |
| 11 | Egg Albumen | 1.23 |
|   | Corn Syrup | 62.0 |
|   | Water | 44.18 |
|   | Antacid** | 32.02 |
|   | Titanium Dioxide | .57 |
| 12 | Egg Albumen | 8.75 |
|   | Corn Syrup | 79.61 |
|   | Water | 11.64 |
| 13 | Milk Protein Casein) | 3.06 |
|   | Gelatin | 3.06 |
|   | Corn Syrup | 75.51 |
|   | Water | 18.36 |
| 14 | Egg Albumen | 3.06 |
|   | Milk Protein (Casein) | 3.06 |
|   | Corn Syrup | 75.51 |
|   | Water | 18.36 |
| 15 | Egg Albumen | 2.8 |
|   | Milk Protein (Casein) | 2.8 |
|   | Fine Granular Sugar | 20.5 |

TABLE I-continued

FRAPPE COMPOSITIONS

| EXAMPLE NO. | INGREDIENT | % BY WEIGHT OF FRAPPE |
|---|---|---|
| | Water | 20.5 |
| | Calcium Carbonate | 53.4 |

*Antacid mixture of hydroxymagnesium aluminum sulfate and dialuminum sodium carbonate.
**Co-dried gel of magnesium carbonate and aluminum hydroxide.

The above frappé formulations were prepared into final products by combination with a series of syrup components. The components and their percentages, cooking temperatures of the syrup components and proportions of the frappé component to syrup component are set forth in Table II, below.

TABLE II

| | SYRUP COMPONENT | | | | | | |
|---|---|---|---|---|---|---|---|
| EXAMPLE NO. | % CORN SYRUP | % SUGAR | % STARCH | COOKING TEMPERATURE (°F.) | COOKING VACUUM | % FRAPPE | % SYRUP |
| 1 | 47.2 | 52.7 | 3 | 248 | — | 25 | 75 |
| 2 | 46.1 | 52.9 | 3 | 248 | — | 18 | 82 |
| 3 | 75.2 | 24.8 | 3 | 280 | — | 38.1 | 61.9 |
| 4 | 57.8 | 42.2 | 3 | 280 | — | 38.1 | 61.9 |
| 5 | 57.8 | 42.2 | 3 | 270 | — | 38.1 | 61.9 |
| 6 | 65.6 | 34.4 | 3 | 280 | — | 38.2 | 61.8 |
| 7 | 75.3 | 24.7 | 3 | 280 | — | 38.2 | 61.8 |
| 8 | 70.5 | 29.5 | 3 | 280 | 10" | 38.2 | 61.8 |
| 9 | 70.5 | 29.5 | 3 | 280 | 5" | 38.2 | 61.8 |
| 10 | 75.3 | 24.7 | 3 | 280 | 10" | 38.2 | 61.8 |
| 11 | 65.6 | 34.4 | 3 | 280 | 10" | 38.2 | 61.8 |
| 12 | 53.47 | 46.53 | 3 | 280 | 10" | 18.4 | 81.6 |
| 13 | 53.48 | 46.52 | 3 | 268 | — | 17.5 | 82.5 |
| 14 | 53.46 | 46.54 | 3 | 268 | — | 18.4 | 81.6 |
| 15 | 47.4 | 52.6 | 3 | 274 | — | 26.5 | 73.5 |

This invention may be embodied in other forms or carried out in other ways without departing from the spirit or essential characteristics thereof. The present invention is therefore to be considered as in all respects illustrative and not restrictive, the scope of the invention being indicated by the appended claims, and all changes which come within the meaning and range of equivalency are intended to be embraced therein.

What is claimed is:

1. A chewable comestible product, which comprises:
   (1) from about 10% to about 35% of a frappé component having a density of at least 1.0 comprising,
      (a) whipping agent present in an amount of from 1.0% to about 9% by weight of said frappé component;
      (b) corn syrup in an amount of up to about 80% by weight of said frappé component;
      (c) sugar in an amount of up to about 40% by weight of said frappé component;
      (d) water in an amount of from about 4% to about 25% by weight of said frappé component;
      (e) an antacid compound in the amount of about 30% to about 55%; and
   (2) a syrup component comprising,
      (a) a corn syrup in the amount of about 20% to about 55% by weight of the syrup component;
      (b) sugar in the amount of from 45% to about 80% by weight of the syrup component;
      (c) starch in the amount of up to about 7% by weight of the syrup component; and
      (d) water in the amount of up to about 13% by weight of the syrup component, said syrup component comprising the remainder of the comestible product.

2. The comestible product of claim 1 wherein said whipping agent is selected from the group consisting of egg albumen, gelatin, milk protein, vegetable protein, and mixtures thereof.

3. The comestible product of claim 2 wherein said frappé possesses a density ranging from about 1.0 to about 1.6.

4. The comestible product of claim 1 wherein said sugar is selected from the group consisting of invert sugar, liquid sugar, fine granulated sugar, and mixtures thereof.

5. The comestible product of claim 4 wherein said frappé possesses a density ranging from about 1.0 to about 1.6.

6. The comestible product of claim 1 wherein said frappé possesses a density ranging from about 1.0 to about 1.6.

7. The comestible product of claim 1 wherein said antacid compound is selected from the group consisting of hydroxymagnesium aluminum sulfate; dialuminum sodium carbonate; calcium carbonate; sodium bicarbonate; aluminum hydroxide, magnesium hydroxide, magnesium carbonate, a co-dried gel of magnesium carbonate and aluminum hydroxide; and mixtures thereof.

8. The comestible product of claim 7 wherein the finally prepared product possesses a density ranging from about 1.1 to about 1.6.

9. The comestible product of claim 7 further including a material selected from colorants, flavorings, oils, preservatives, and mixtures thereof.

10. The comestible product of claim 1 wherein said antacid compound has a particle size ranging from about 1.0 to about 1.5 microns.

11. The comestible product of claim 10 wherein said antacid compound comprises a co-dried gel of magnesium carbonate and aluminum hydroxide.

12. The comestible product of claim 11 wherein the finally prepared product possesses a density ranging from about 1.1 to about 1.6.

13. The comestible product of claim 1 wherein the finally prepared product possesses a density ranging from about 1.1 to about 1.6.

14. The comestible product of claim 10 wherein the finally prepared product possesses a density ranging from about 1.1 to about 1.6.

15. The comestible product of claim 1 further including a material selected from colorants, flavorings, oils, preservatives, and mixtures thereof.

16. A method for preparing a chewable comestible product, which comprises:
   A. preparing a frappé component having a density of at least 1.0, said frappé component comprised of the materials as stated in claim 1;
   B. preparing a syrup component comprised of the materials as stated in claim 1;
   C. slowly adding said syrup component to said frappé component under agitation and at an elevated temperature of from about 175° F. to about 200° F.;
   D. mixing said fappé component and said syrup component at a temperature from about 170° F. to about 180° F.;
   E. adding a material selected from colorants, flavoring, oils, preservatives, and mixtures thereof;
   F. cooling and kneading the mixture of Step E to a temperature of about 110° F. to about 130° F.; and
   G. forming said mixture into said comestible product.

17. The method of claims 16 wherein said whipping agent is selected from the group consisting of egg albumen, gelatin, milk protein, vegetable protein, and mixtures thereof.

18. The method of claims 16 wherein said sugar is selected from the group consisting of invert sugar, liquid sugar, fine granulated sugar, and mixtures thereof.

19. The method of claim 18 wherein said antacid compound has a particle size ranging from about 1.0 to about 1.5 microns.

20. The method of claim 18 wherein said antacid compound comprises a co-dried gel of magnesium carbonate and aluminum hydroxide.

21. The method of claim 16 wherein said antacid compound is selected from the group consisting of hydroxymagnesium aluminum sulfate; dialuminum sodium carbonate; calcium carbonate; sodium bicarbonate; aluminum hydroxide, magnesium hydroxide, magnesium carbonate; a co-dried gel of magnesium carbonate and aluminum hydroxide; and mixtures thereof.

22. The method of claim 16 wherein the ingredients of said frappé component are mixed for a period of time sufficient to form a hydrated mixture.

23. The method of claim 22 wherein said hydrated mixture is further agitated and brought to a temperature of about 210° F.

24. The method of claim 16 wherein all of the ingredients of said frappé component excepting said antacid are combined into an initial mixture under agitation and heat, and said antacid is thereafter added to said initial mixture.

25. The method of claim 16 wherein said syrup component comprises a mixture of corn syrup, sugar and water, that is prepared by heating to a temperature of from about 240° F. to about 280° F.

26. The method of claim 16 wherein said syrup component is added to said frappé component at a temperature of from about 195° F. to about 200° F.

27. The method of claim 26 wherein said syrup component and said frappé component are agitated after said addition for a period of time sufficient for the temperature of the resulting mixture to drop to about 190° F.

28. The method of claim 16 wherein, during the mixing of Step D, there is added to said Step D mixture, one or more materials selected from animal and vegetable fats, and oils, derivatives thereof, preservatives, and mixtures thereof.

29. The method of claim 28 wherein said materials are added in amounts of up to about 7.0% by weight of said comestible product.

30. The method of claim 28 wherein said mixture is thereafter agitated until the temperature thereof drops to from about 185° F. to about 180° F., at least one flavoring is then added thereto, and the mixture is thereafter further agitated until the temperature thereof drops to about 170° F.

31. The method of claim 28 wherein said mixture is thereafter agitated for at least 7 minutes.

32. The method of claim 16 wherein said mixture is kneaded and cooled to a temperature of from about 110° F. to about 117° F.

33. The method of claim 16 wherein said mixture is formed by cold forming at a temperature below 110° F.

34. The method of claim 33 wherein said mixture is extruded and cut into discrete shapes.

35. The method of claim 16 wherein the product formed by Step F possesses a density of from about 1.1 to about 1.6.

* * * * *